United States Patent [19]

Allard

[11] 4,270,880
[45] Jun. 2, 1981

[54] LOAD TRANSFER SYSTEM

[75] Inventor: Pierre Allard, Brive-la-Gaillarde, France

[73] Assignee: Allard S.a.r.l., Brive-la-Gaillarde, France

[21] Appl. No.: 894,547

[22] Filed: Apr. 7, 1978

[30] Foreign Application Priority Data

Sep. 9, 1977 [DE] Fed. Rep. of Germany ....... 2740775

[51] Int. Cl.³ .............................................. B65G 47/64
[52] U.S. Cl. .................................... 414/391; 414/337; 414/389
[58] Field of Search ............... 414/337, 338, 373, 389, 414/390, 391, 393

[56] References Cited

U.S. PATENT DOCUMENTS

| | | | |
|---|---|---|---|
| 1,495,339 | 5/1924 | Maher | 414/337 X |
| 1,499,971 | 7/1924 | Callison | 214/38 |
| 1,785,167 | 12/1930 | Young | 414/389 X |
| 1,785,169 | 12/1930 | Young | 414/389 X |
| 1,818,358 | 8/1931 | Romine | 214/38 |
| 2,530,704 | 11/1950 | Kemp | 214/113 |
| 3,910,196 | 10/1975 | Denenburg | 414/337 X |

*Primary Examiner*—Robert W. Saifer
*Assistant Examiner*—Terrance L. Siemens
*Attorney, Agent, or Firm*—McAulay, Fields, Fisher, Goldstein & Nissen

[57] ABSTRACT

A system for the transfer of loads from a wheeled transporter to a roller conveyor. The system includes two transfer conveyors which are arranged in alignment with a roller conveyor supplying a machine. Strips are provided on the wheeled transporter which form spaces therebetween to receive bars which project laterally from a pallet on the wheeled transporter. The pallet can be raised and lowered so that the bars can be moved onto the two transfer conveyors to facilitate transfer of the loads from the wheeled transporter to the two transfer conveyors which in turn transfers the loads to the roller conveyor or supply of the machine.

5 Claims, 15 Drawing Figures

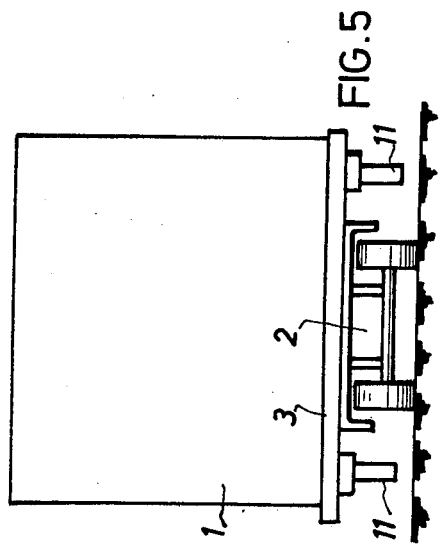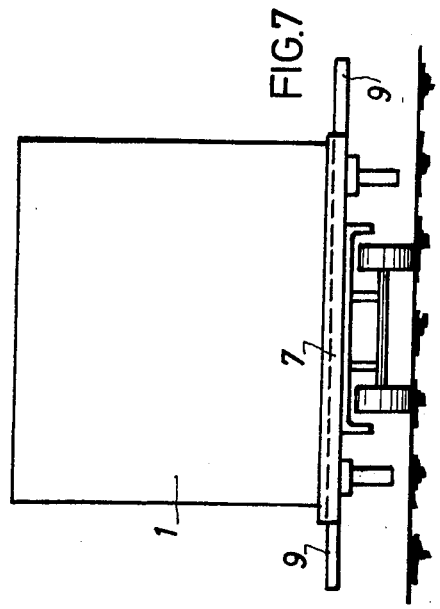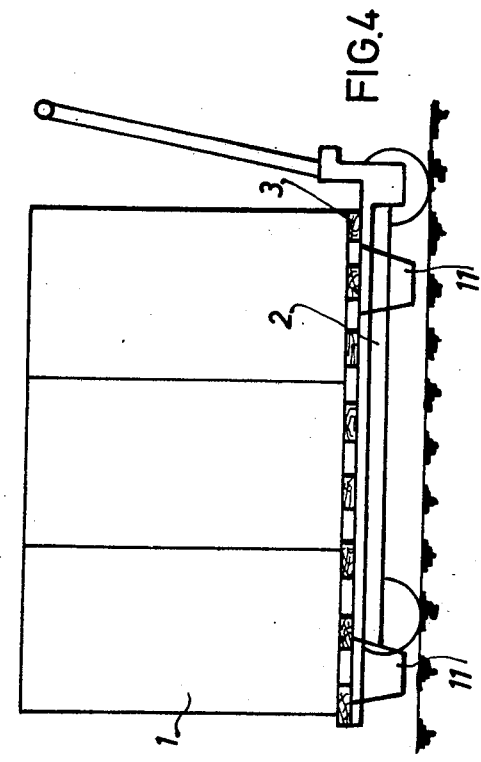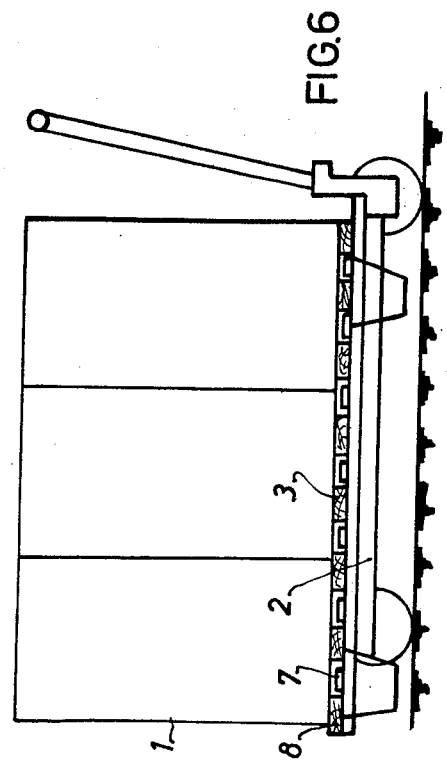

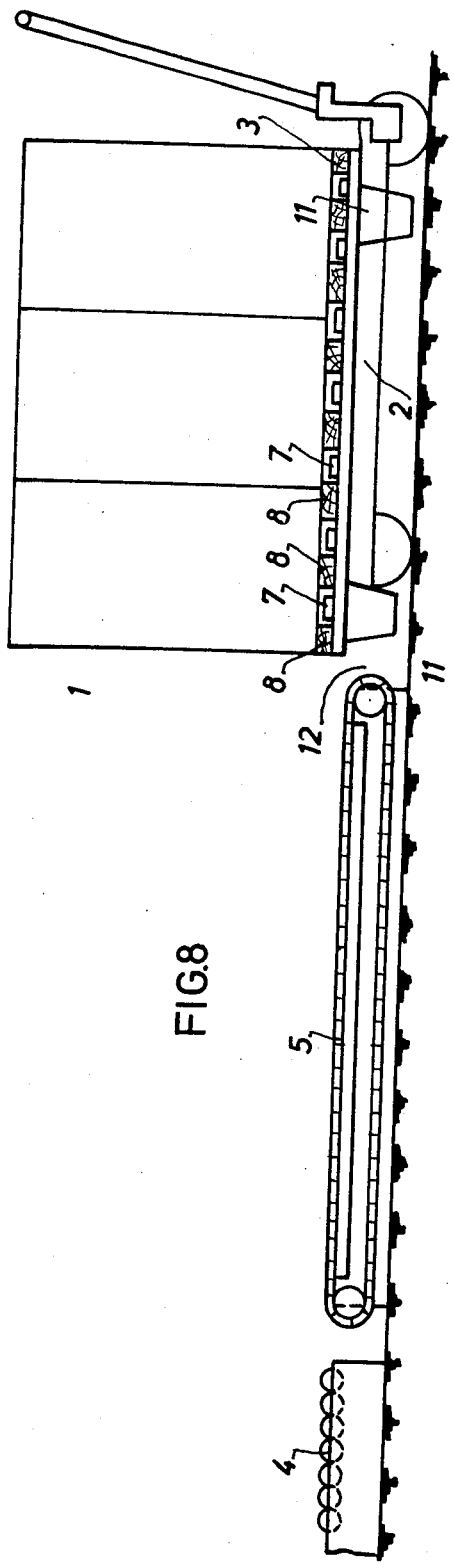
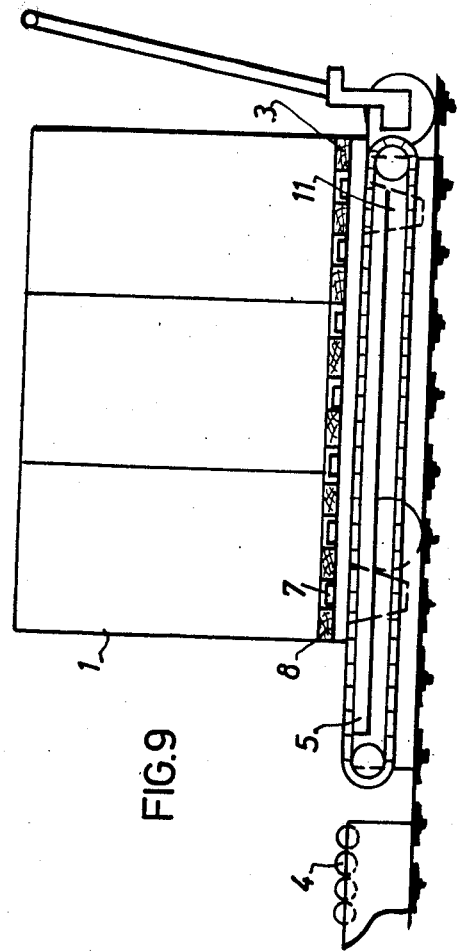
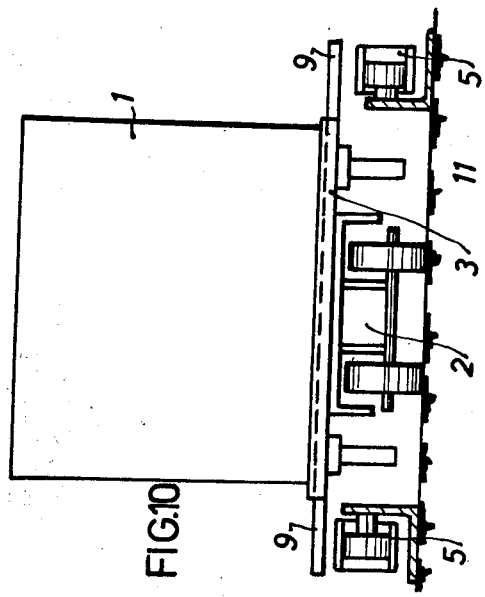

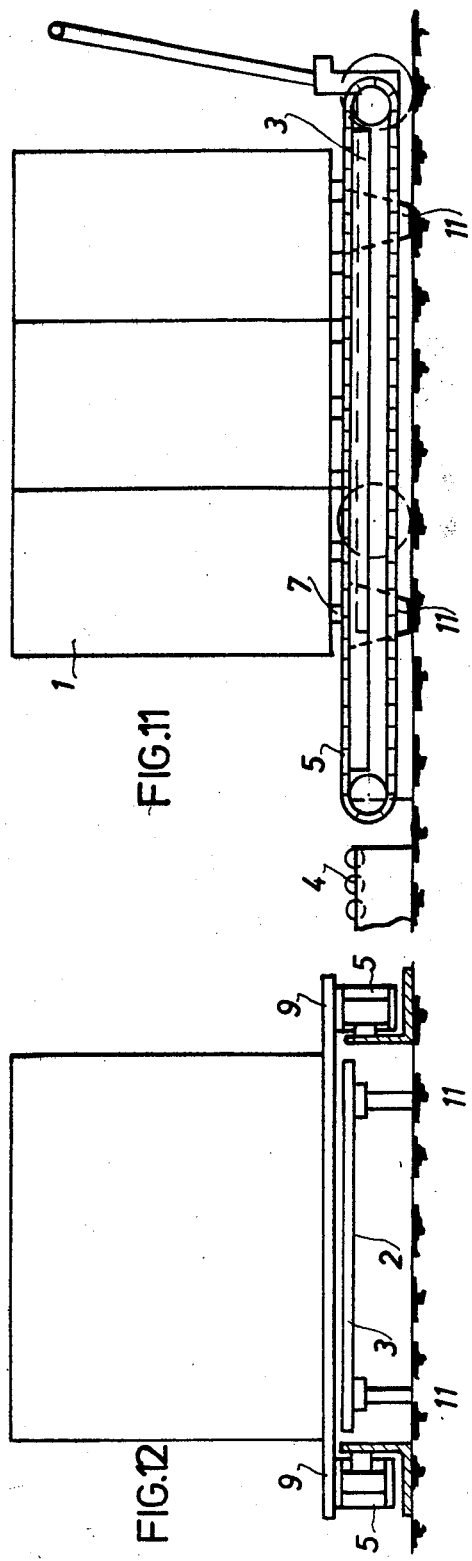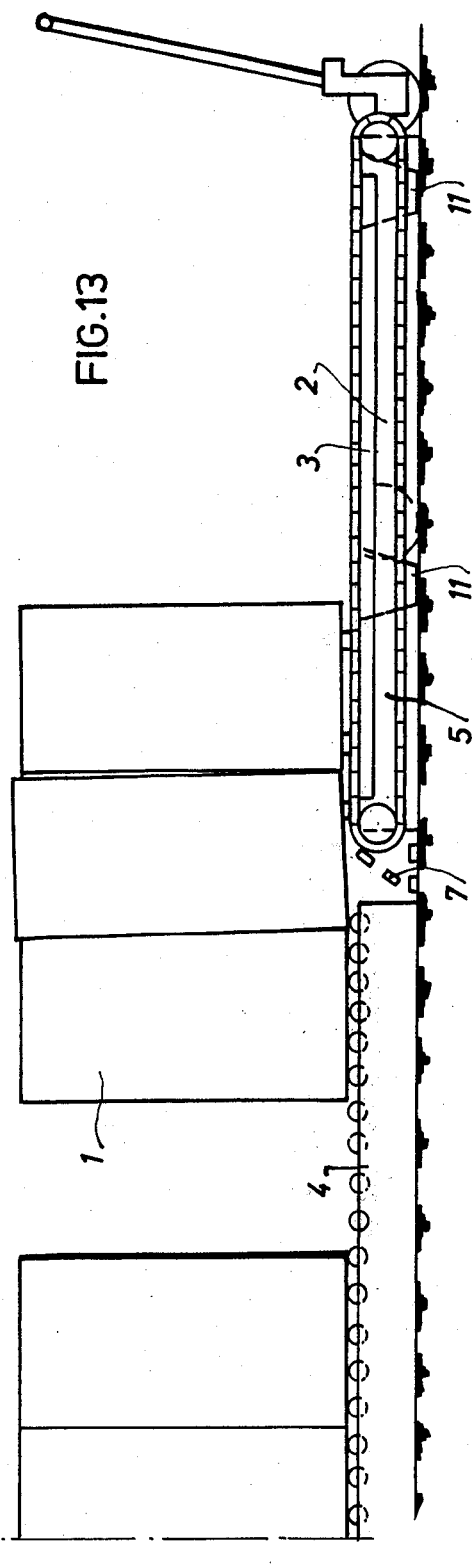

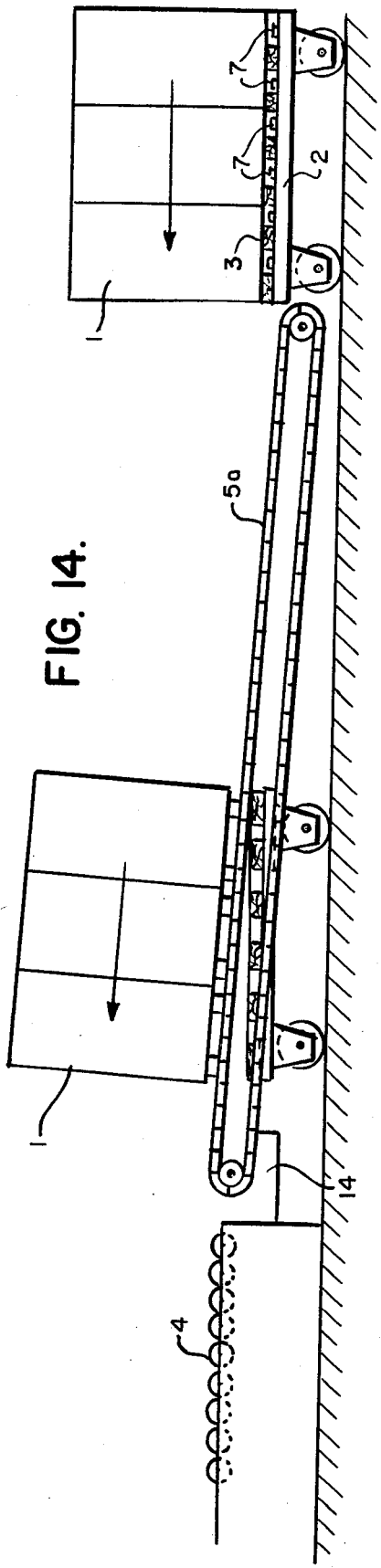
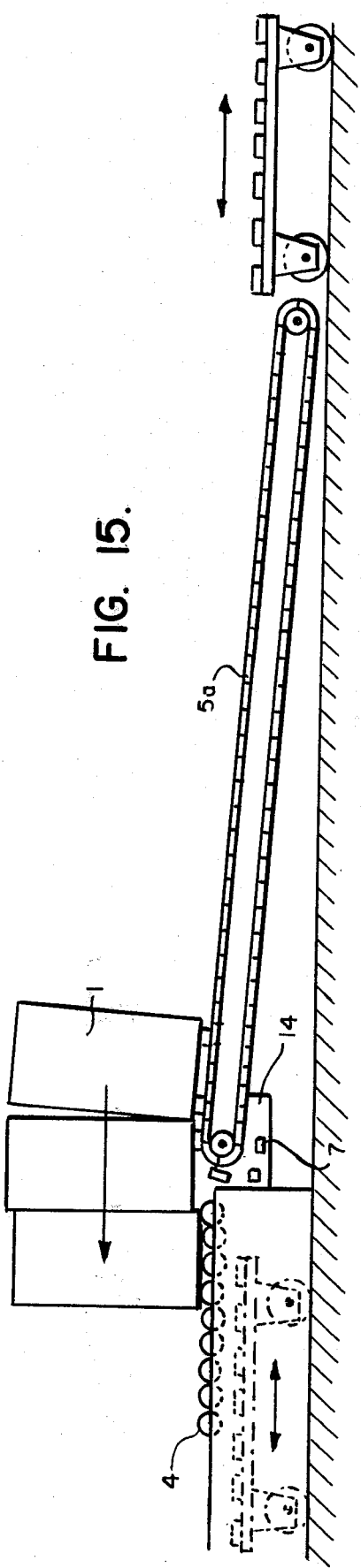

LOAD TRANSFER SYSTEM

The present invention concerns a system in particular for transferring (or discharging) loads, from a wheeled transporter on which they are carried in a palletised condition, to a roller, belt, chain or like conveyor on which they are to be disposed in a loose condition, that is to say, without the pallet which initially supported them.

The invention therefore aims to overcome a problem, in regard to which hitherto only complex apparatus specific to the very nature of the loads to be carried had been proposed.

The invention achieves this result by means of a transfer system of simple design and low cost price, which can be easily adapted to installations already in existence and which can be used for loads of widely varying nature.

Consequently, the transfer system according to the invention essentially comprises two conveyor means, for example two belt or chain conveyors, which are arranged in alignment with the conveyor or the supply means of a machine, the two conveyor means being parallel to the longitudinal axis of the conveyor and at the same height as the conveyor, the two conveyor means being mutually spaced at a distance sufficient to permit the passage therebetween of a wheeled transporter carrying the palletised loads. The two conveyor means are intended to co-operate with a series of bars which, before the transfer step, are slid below the loads, in the spaces between the strips which in conventional manner form the platform portion of the pallets which carry the loads. The length of the bars is such that they project laterally from each side of the pallet and that they can come into a position of bearing on the two conveyor means when the wheeled transporter is positioned between the conveyor means and then lowered. In this last position, the loads are then only supported by the bars and are entrained by the two conveyor means onto the conveyor or the supply means of the machine.

According to a feature of the invention, the two conveyor means are longitudinally spaced from the conveyor or the machine supply means, so as to leave a sufficiently wide gap for the bars to pass through, when they arrive at the end of the conveyor means, so that the bars can then fall into a magazine which is especially designed for that purpose, the gap however being sufficiently narrow not to impede the movement of the load from the conveyor means to the conveyor.

It will be noted that in the above-described embodiment, it is assumed that the conveyor means is at a constant height and that the transporter carriage can be lowered. It is clear that the opposite would be possible, i.e. the wheeled transporter can be of a constant height while the conveyor means can be so arranged that they can be raised or lowered.

An embodiment of the invention will be described hereinafter, by way of non-limiting example, with reference to the accompanying drawings in which:

FIG. 4 is a longitudinal view of a conventional wheeled transporter carriage;

FIG. 5 is a transverse view, partially in section of the wheeled transporter carriage of FIG. 5;

FIG. 6 is a longitudinal view of the wheeled transporter carriage of FIG. 4 provided with bars according to the invention;

FIG. 7 is a transverse view, partially in section of the transporter carriage and bars as shown in FIG. 6;

FIG. 8 is an overall diagrammatic view in longitudinal section of the transfer system, before the transfer phase, FIG. 9 is a view in longitudinal section of the transfer system in the first phase of the transfer operation;

FIG. 10 is a transverse sectional view of the transfer system of FIG. 9;

FIG. 11 is a view in longitudinal section of the transfer system during a second phase of the transfer operation;

FIG. 12 is a transverse sectional view of the transfer system of FIG. 11; and,

FIG. 13 shows a view in longitudinal section of the system, at the end of the transfer operation, and FIG. 14 is an overall diagramatic view of the transfer system showing the conveyor means in an inclined position.

FIG. 15 is an overall diagramatic view of the system with the conveyor means in an inclined condition as shown in FIG. 14 but at the end of the transfer operation.

Figure 3:
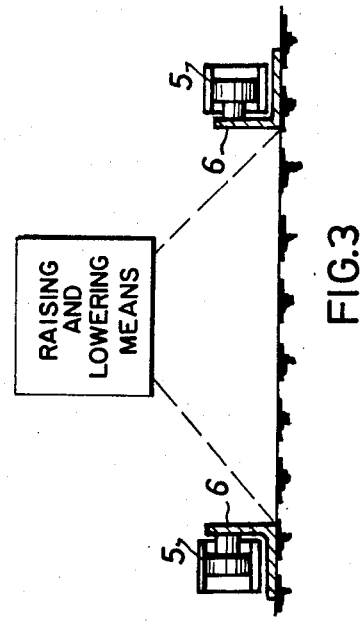
FIG. 3 is a transverse sectional view of the two conveyor means of FIG. 1.

Referring to FIG. 8, the system for transferring loads 1 from a wheeled transporter 2 on which they are palletised (pallet 3) to a roller conveyor 4 essentially comprises two conveyor means 5 which are arranged side-by-side, and parallel to the longitudinal axis of the roller conveyor 4.

Figure 1:
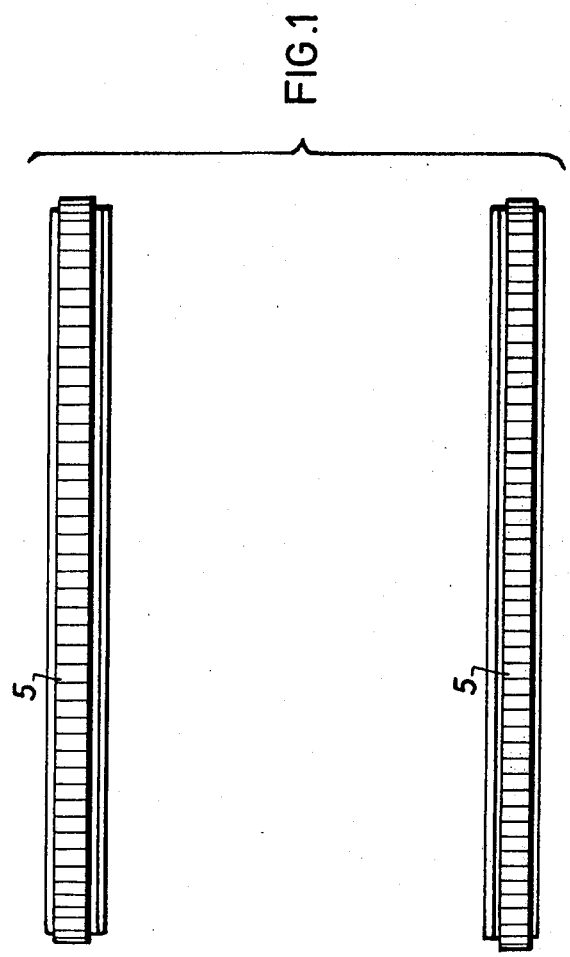
FIG. 1 is a plan view of two conveyor means which are usable in the transfer system according to the invention.
Figure 2:
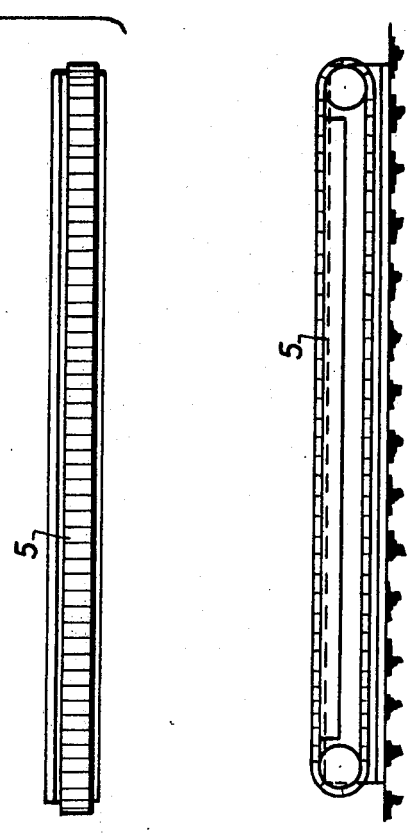
FIG. 2 is a longitudinal sectional view of the two conveyor means of FIG. 1.

In the embodiment shown in FIGS. 1, 2 and 3, the two conveyor means 5 comprise two narrow-belt conveyors carried by a L-shaped support structure 6 which is fixed to the ground, and driven by a drive and transmission means (not shown).

The distance between the two conveyor means 5 is such as to permit the passage therebetween of the wheeled transporter 2 with loads 1 and its pallet 3 (FIG. 10).

The conveyor means 5 are provided to co-operate with bars 7 which are slid into the transverse gaps between the strips 8 which, in conventional manner, form the platform portion of the pallet 3.

The length of the bars 7 is such that their ends 9 project from the pallet 3 on respective sides thereof, and, when the wheeled transporter 2 is engaged between the two conveyor means 5 (FIGS. 9 and 10), the ends 9 are disposed above the belts of the conveyor means 5.

The wheeled transporter 2 comprises a lifting means, for example a hydraulic lifting means, which provides therefor a raised position corresponding to the load-transporting position, and a lowered position in which it rests on legs 11 and is accordingly immobilised.

Thus, to transfer loads 1 from the wheeled transporter 2 onto the roller conveyor 4, as indicated above the bars 7 are first fitted into the transverse gaps between the strips 8, so that they project equally from each side of the pallet 3. The wheeled transporter 2 is then engaged between the two conveyor means 5 (FIGS. 9 and 10) and then the transporter 2 is moved to the lowered position (FIGS. 11 and 12). In this position the loads 1 are no longer supported except by the bars 7 which then rest, at each of their ends 9, on the two conveyor means 5.

Thereafter, the loads 1 are entrained, with the bars 7 which support them, towards the roller conveyor 4. The space 12 left free between the two conveyor means 5 and the conveyor 4 is sufficiently narrow to permit the loads 1 to be transferred from the conveyor means 2 to the roller conveyor 4 (FIG. 13). However, the gap 12 is sufficiently wide to permit the bars 7 to pass therethrough, whereby the bars 7 fall to the ground as they reach the end of the conveyor means 5. Once the bars have fallen into the gap 12, the bars 7 can be removed and re-used for a fresh load-transfer operation.

It should be noted that, during the transfer operation, the pallet 3 remains on the platform portion or the fork of the wheeled transporter 2, and can therefore be removed, with the transporter 2, at the end of the transfer operation. For this purpose, the transporter 2 is moved into the raised position so that it is then only resting on its wheels, and is rolled rearwardly until it is out of the transfer region.

To avoid using a wheeled transporter provided with a lifting means, it would be possible for the conveyor means 5 to be slightly inclined relative to the horizontal so that the front ends thereof are slightly higher than the height of the bars 7, and the rearward ends of the conveyor means 5 are slightly lower than the height of the bars 7. Then, to transfer the loads, it is sufficient to engage the carriage between the two conveyor means 5 until the first bar 7 (the bar which is most forward on the transporter 2) comes to bear on the conveyor belt of the two conveyor means 5. This bar is then entrained and gradually lifted, causing the transporter 2 to move forwardly. During this forward movement, all the bars will be raised and entrained so that at the end of the movement of the carriage (when the last bar has been lifted), the carriage will be completely freed from its load which will then finish by being transferred onto the roller conveyor.

As best seen in FIG. 14, the conveyor means is shown as an inclined conveyor means 5a. FIG. 14 is substantially similar to FIG. 8 except that the two conveyor means 5 are shown in an inclined condition 5a. The roller conveyor 4 is shown and the palletised load 1 is shown in a first position ready for placement onto the two conveyor means 5a, and in a second position carried by the two conveyor means 5a.

Turning now to FIG. 15 which shows the loads being transferred from the two conveyor means 5a to the roller conveyor 4 with the bars 7 dropping into the space between the roller conveyor 4 and the two conveyor means 5a. The bars which are placed into the spaces between the planks or strips 8 fall into the space between the roller conveyor 4 and the two conveyor means 5a. In addition, a magazine 14 can also be used to catch such bars if desired.

It should be noted that the load 1 is transferred from the two conveyor means 5a to the roller conveyor 4.

While there has been shown what is considered to be the preferred embodiments of the invention, it will be obvious to those skilled in the art that various changes and modifications may be made therein without departing from the scope of the invention.

I claim:

1. A system in particular for transferring loads from a wheeled transporter on which they are carried on a pallet in a palletised condition, to a roller conveyor on which they are to be disposed in a loose condition, comprising:

two transfer conveyor means arranged in alignment with said roller conveyor, said two transfer conveyor means being parallel to the longitudinal axis of said roller conveyor and movable to the same height as said roller conveyor, and said two transfer conveyor means being mutually spaced at a distance sufficient to permit the passage therebetween of said wheeled transporter carrying the palletised loads;

strips on said wheeled transporter forming a conventional platform portion for the loads carried in the palletised condition, said strips having therebetween spaces, a series of bars adapted to be received in said spaces, said two transfer conveyor means being intended to co-operate with said series of bars which, before the transfer step, are slid below the loads, into said spaces between said strips forming said platform portion of the pallets which carry the loads, and means varying the relative height between said transporter and said two transfer conveyor means, the length of said bars being such that they project laterally from the pallet and that they can come into a position of bearing onto said two transfer conveyor means after the relative height as between the wheeled transporter and said two transfer conveyor means has been suitably varied.

2. A system according to claim 1, wherein said wheeled transporter includes:
   legs; and,
   said varying means includes hydraulic lifting means for providing said transporter with a raised position corresponding to a load-transporting position thereof, and a lowered position corresponding to a load-transferring position in which said wheeled transporter rests on said legs.

3. A system according to claim 1, wherein said varying means includes means for raising or lowering same.

4. A system according to claim 1, wherein said two transfer conveyor means are slightly inclined relative to the horizontal.

5. A system according to claim 1, 2, 3 or 4, wherein:
   said two conveyor means are longitudinally spaced from said roller conveyor, so as to leave a sufficiently wide gap for the bars to pass therethrough, when they arrive at the end of said two conveyor means, and
   said gap being sufficiently narrow not to impede the movement of the load from said two conveyor means to said roller conveyor.

* * * * *